US008472589B1

(12) United States Patent
Green et al.

(10) Patent No.: US 8,472,589 B1
(45) Date of Patent: Jun. 25, 2013

(54) LOCALLY STORING VOICEMAILS AND COMMUNICATING THEM TO OTHER WIRELESS MOBILE DEVICES

(75) Inventors: Douglas Green, Lenexa, KS (US); Arthur D. Townsend, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1663 days.

(21) Appl. No.: 11/864,237

(22) Filed: Sep. 28, 2007

(51) Int. Cl.
*H04M 1/64* (2006.01)
*H04N 7/15* (2006.01)
*H04L 12/66* (2006.01)

(52) U.S. Cl.
USPC .......... 379/88.17; 340/12.22; 370/352; 379/88.12; 379/88.18; 379/88.23; 379/142.06; 379/225; 455/405; 455/412.1; 455/413; 717/168

(58) Field of Classification Search
USPC ........... 340/12.22; 379/67.1, 88.17, 88.18, 379/142.04, 142.06, 210.01, 225, 88.05, 379/88.12, 88.23, 202.01, 209.01; 455/405, 455/412.1, 413; 717/168; 370/352
See application file for complete search history.

(56) References Cited

U.S. PATENT DOCUMENTS

| | | | | |
|---|---|---|---|---|
| 5,268,957 A * | 12/1993 | Albrecht | ............ | 379/209.01 |
| 5,884,160 A * | 3/1999 | Kanazaki | ............ | 455/413 |
| 5,903,627 A * | 5/1999 | Shaffer et al. | ............ | 379/67.1 |
| 6,259,772 B1 * | 7/2001 | Stephens et al. | ............ | 379/88.23 |
| 6,785,363 B2 * | 8/2004 | Culliss | ............ | 379/67.1 |
| 7,310,413 B2 * | 12/2007 | McClung et al. | ............ | 379/88.05 |
| 7,340,046 B2 * | 3/2008 | McClung et al. | ............ | 379/202.01 |
| 7,454,000 B1 * | 11/2008 | Henderson | ............ | 379/142.04 |
| 7,532,710 B2 * | 5/2009 | Caputo et al. | ............ | 379/88.18 |
| 7,676,028 B2 * | 3/2010 | Platzer | ............ | 379/88.17 |
| 7,852,828 B2 * | 12/2010 | McClung et al. | ............ | 370/352 |
| 7,991,143 B2 * | 8/2011 | Abramson et al. | ............ | 379/225 |
| 8,135,123 B2 * | 3/2012 | Moore | ............ | 379/210.01 |
| 8,345,833 B1 * | 1/2013 | Trandal et al. | ............ | 379/88.12 |
| 2001/0029175 A1 * | 10/2001 | Sellen et al. | ............ | 455/412 |
| 2004/0096046 A1 * | 5/2004 | Lection et al. | ............ | 379/142.06 |
| 2005/0069121 A1 * | 3/2005 | Faruque et al. | ............ | 379/225 |
| 2006/0101447 A1 * | 5/2006 | Koch | ............ | 717/168 |
| 2007/0066284 A1 * | 3/2007 | Gatzke et al. | ............ | 455/413 |
| 2007/0280434 A1 * | 12/2007 | Howell et al. | ............ | 379/67.1 |
| 2008/0165938 A1 * | 7/2008 | Yasko | ............ | 379/88.17 |
| 2008/0167013 A1 * | 7/2008 | Novick et al. | ............ | 455/413 |
| 2008/0207176 A1 * | 8/2008 | Brackbill et al. | ............ | 455/413 |
| 2009/0015433 A1 * | 1/2009 | James et al. | ............ | 340/825.69 |
| 2010/0159889 A1 * | 6/2010 | Sigmund et al. | ............ | 455/413 |
| 2012/0015624 A1 * | 1/2012 | Scott et al. | ............ | 455/405 |

OTHER PUBLICATIONS

"Phone Recorder Plus 1.1", http://phone-recorder-plus.teley.qarchive.org/, QArchive.org, 2006-2007.
"Conaito VoiceMail SDK", http://conaito-voicemail-sdk.conaito-voip-communications.qarchive.org/, QArchive.org, 2006-2007.

* cited by examiner

*Primary Examiner* — Gerald Gauthier

(57) ABSTRACT

Embodiments of the invention provide ways to locally store and deliver voicemail messages on personal communication devices. An illustrative method includes initiating a call to a recipient's device, receiving an indication the call cannot be established, prompting the user to leave a voicemail, storing the voicemail locally on the communications device, and sending the voicemail to the recipient's device.

19 Claims, 8 Drawing Sheets

LOCALLY STORING VOICEMAILS AND COMMUNICATING THEM TO OTHER WIRELESS MOBILE DEVICES

SUMMARY

The present invention is defined by the claims below, but summarily, embodiments of the present invention provide a system, method, and media for, among other things, locally storing a voicemail on a calling device and forwarding it to a recipient's device. Embodiments of the present invention have several practical applications in the technical arts including reducing network utilization, improving the fidelity of voicemail messages, and making them available in off-line environments.

In a first illustrative aspect, a set of computer-useable instructions facilitate a method that includes attempting to initiate a call to a target device, receiving an indication that the call cannot be established with the target device incident to attempting to initiate the call, automatically prompting a user to leave a voicemail message that is to ultimately be delivered to the target device, locally storing the voicemail message on the calling device, establishing a communications pathway with the target device, and communicating the voicemail message to the target device by way of the communications pathway.

In a second illustrative aspect, a set of computer-useable instructions provides for the ability to carry out a method that includes receiving an indication that an attempted call made to a target device is not to be established, receiving a request to establish a data-communications pathway with the target device that can be used to communicate data from a calling device to the target device, accepting the request, receiving a voicemail message from the calling device by way of the communications pathway, and locally storing the voicemail message on the target device.

In a third illustrative aspect, when an intermediary device is employed, a set of computer-usable instructions enable receiving an attempt to initiate a call from a calling device, receiving an indication that the call cannot be established with a target device, communicating the indication to the calling device, receiving a request to establish a communications pathway with the calling device, receiving a locally stored voicemail message from the calling device by way of the communications pathway, storing the locally stored voicemail message from the calling device, sending a request to establish a communications pathway to the target device, and communicating the locally stored voicemail message to the target device.

In a final illustrative aspect, a set of computer-useable instructions provide sending a request to establish a communications pathway with a second voicemail client, the request stemming from an inability to set up a call between a first calling device and a second calling device; receiving a response that indicates an ability to establish the communications pathway; establishing the communications pathway between the first voicemail client and the second voicemail client; communicating a locally stored voicemail from the first voicemail client to the second voicemail client; and locally storing the voicemail communicated from the first voicemail client on the second calling device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ACL | Access Control List |
| CD-ROM | Compact Disk Read Only Memory |
| DVD | Digital Versatile Discs |
| EEPROM | Electrically Erasable Programmable Read Only Memory |
| ESN | Equipment Serial Number |
| H.323 | An umbrella recommendation from the ITU Telecommunication Standardization Sector that defines the protocols to provide audio-visual communication sessions on any packet network |
| IP | Internet Protocol |
| MEID | Mobile Equipment Identifier |
| MAC | Media Access Control |
| P2P | Peer-To-Peer networking |
| SIP | Session Initiated Protocol |
| SS7 | Signaling System 7 |
| RAM | Random Access Memory |
| ROM | Read Only Memory |

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Illustrative aspects of the invention will be described in greater detail below. Listing some aspects should not be construed as an indication that other aspects do not exist.

Figure 1:
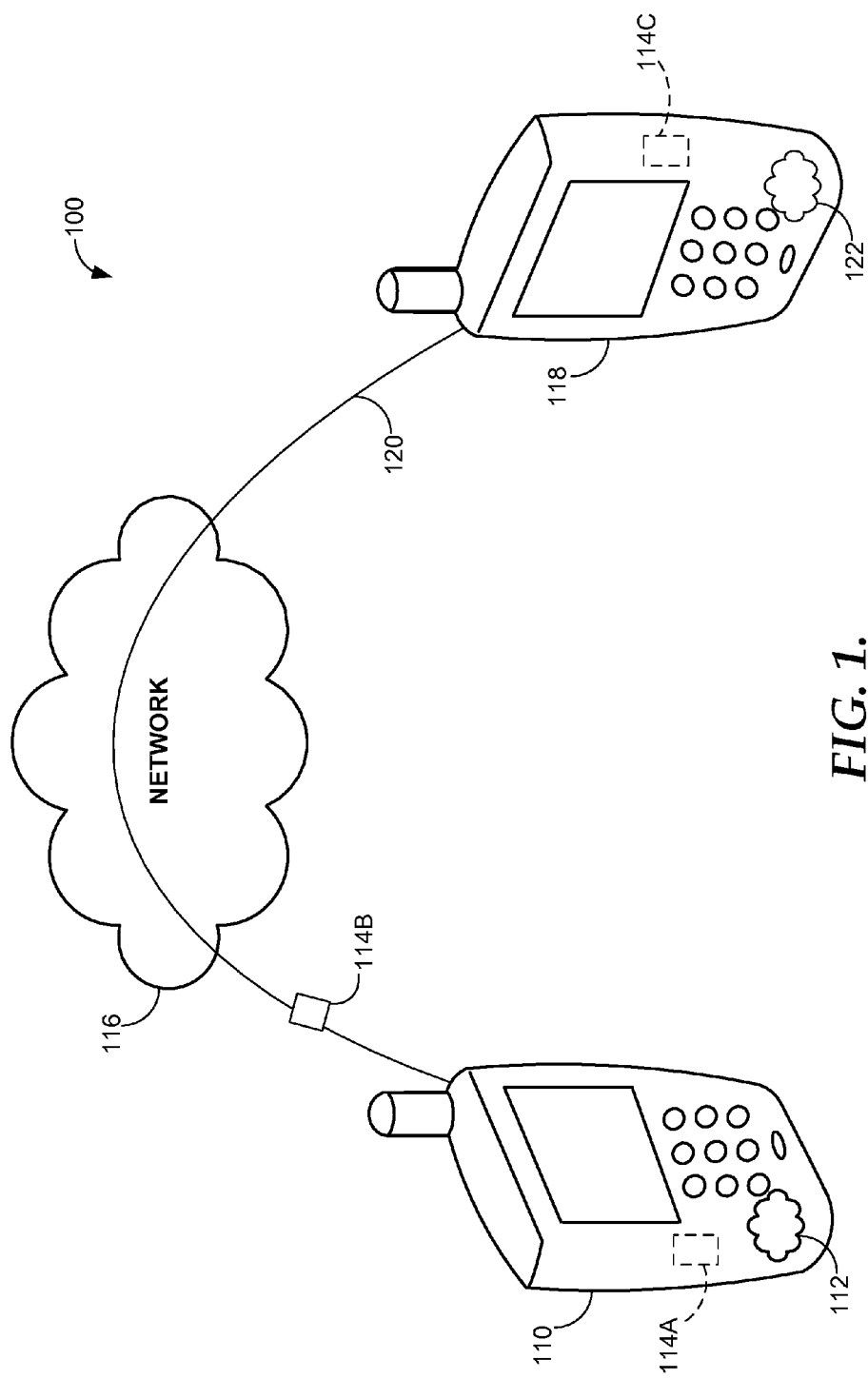
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. A calling device 110 may be a mobile phone, a personal data assistant, a smart phone, or any other consumer-electronics device that is capable of making and receiving telephone calls by way of a wireless communications network 116. Although other connections leading to network 116 are not shown, all embodiments of the present invention utilize a wireless communications network, which may be variously referred to herein as network 116.

As illustratively shown, calling device 110 includes a voicemail client application 112. In some embodiments, the voicemail client 112 is an application separate from the firmware of the operating system of the calling device 110. In other embodiments, they are integrated, and cloud 112 depicts an improved OS that can carry out the functionality described herein. Voicemail client 112 helps facilitate various aspects of the present invention. In some embodiments, it facilitates locally storing a voicemail message 114A, which is communicated through network 116 to a target device 118 via a communications pathway, which is illustratively shown by numeral 120.

Voicemail messages may be referred to herein as by the numeral 114, as opposed to 114A, 114B, or 114C, when doing so will simplify reading the disclosure. In some embodiments, the voicemail message 114 was recorded via various voice-encoding techniques, and can take the form of a file structure to capture and contain the message. For example, voicemail message 114 may take the form of an .MP3, .WAV, or other file.

In some embodiments, communications pathway 120 is facilitated by a session initiated protocol (SIP) and peer-to-peer (P2P) protocol for communicating between devices 112 and 118. Communications pathway 120, which can be packet-based (and thus not an actual physical pathway) carries voicemail message 114B to the target device 118. Target device 118 is similar to calling device 110. It too includes a voicemail client 122, which facilitates receiving voicemail message 114B, and storing it 114C locally.

Figure 2:
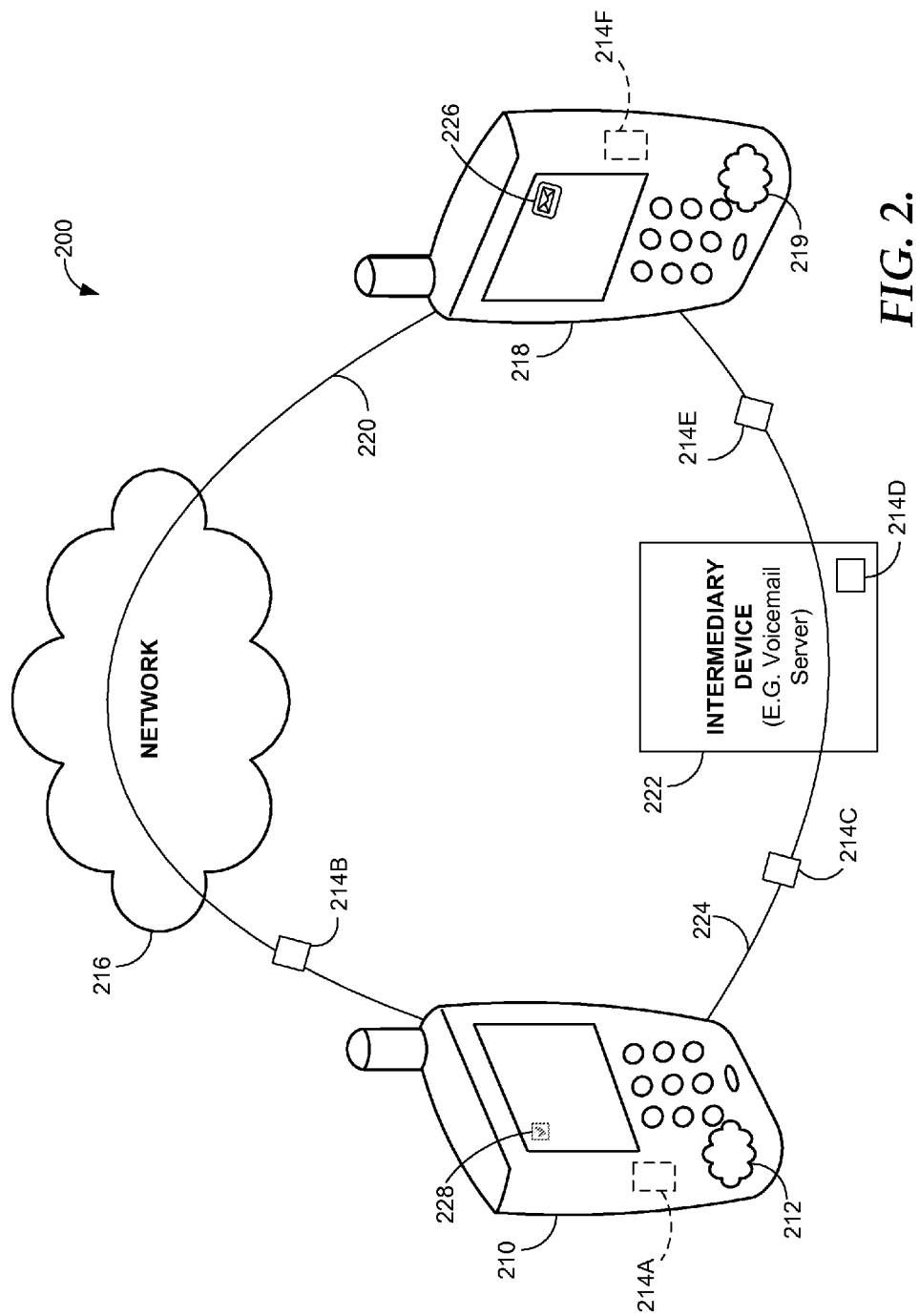
FIG. 2 depicts another illustrative operating environment suitable for practicing an embodiment of the present invention.

Turning now to FIG. 2, another illustrative operating environment suitable for practicing an embodiment of the present invention is provided and referenced generally by the numeral 200. In this embodiment, a calling device 210 is equipped with a voicemail client application 212, which facilitates, among other things, storing a local copy of a voicemail 214A. This voicemail 214A would be locally recorded after an indication is received that indicates that target device 218 is not available.

For example, a caller utilizing calling device 210 may attempt to make a call to target device 218. But, if target device 218 is unavailable for some reason to receive a call from calling device 210, then a user of calling device 210 will be prompted to leave a voicemail message, which will be locally recorded, and is referenced by numeral 214A. As will be explained in greater detail below, a local copy of this voicemail 214B will be communicated through communications network 216 to arrive at target device 218 via a communications path that is illustratively represented by the numeral 220. Communications path 220 need not be an actual pathway, but illustratively represents that even in a packet-based environment, data such as voicemail 214B can be communicated from calling device 210 to target device 218.

Reference numeral 214C depicts a locally stored instance of voicemail message 214A. In one embodiment, the reception of voicemail message 214C is facilitated by a client application 219 that resides on target device 218. As previously mentioned in connection with client applications 112 and 122, client application 219 may be a stand-alone application as well as an improved operating system or other software application associated with target device 218.

In some embodiments, target application 219 also facilitates notifying a user that a new voicemail message is ready for review as well as notifying a sender that voicemail message 214C was received. This return path or other path between target device 218 and calling device 210 is not shown so as to not obscure the present invention, but would be utilized to provide an acknowledgment back to calling device 210 that voicemail message 214C was received in one embodiment.

FIG. 2 also depicts another embodiment of the present invention, wherein an intermediary device 222, such as a voicemail server, is utilized. In this embodiment, only a connection 224 need be maintained rather than a connection 220 to client application 219 (although even connection 220 need not be a persistent connection that allows all of voicemail 214B to be communicated in a single transmission, but can be sporadic as coverage allows, each time sending more of voicemail 214B until all of it is communicated to target device 218).

The embodiment of FIG. 2 would be useful in environments where a communications pathway could be more easily or robustly established with an intermediary device 222, such as a voicemail server, but possibly not with target device 218. In such an embodiment, as will be described in greater detail below, a representation of voicemail 214C of locally stored voicemail 214A is communicated to intermediary device 222, which can operate as a pass-through device, or can locally store a copy of the voicemail message 214D for later delivery. At some later time, the voicemail message 214E can be communicated to target device 218. After voicemail message 214C is received, it can be stored as voicemail message 214F, and a message-waiting notification 226 can be presented on target device 218.

Figure 3:
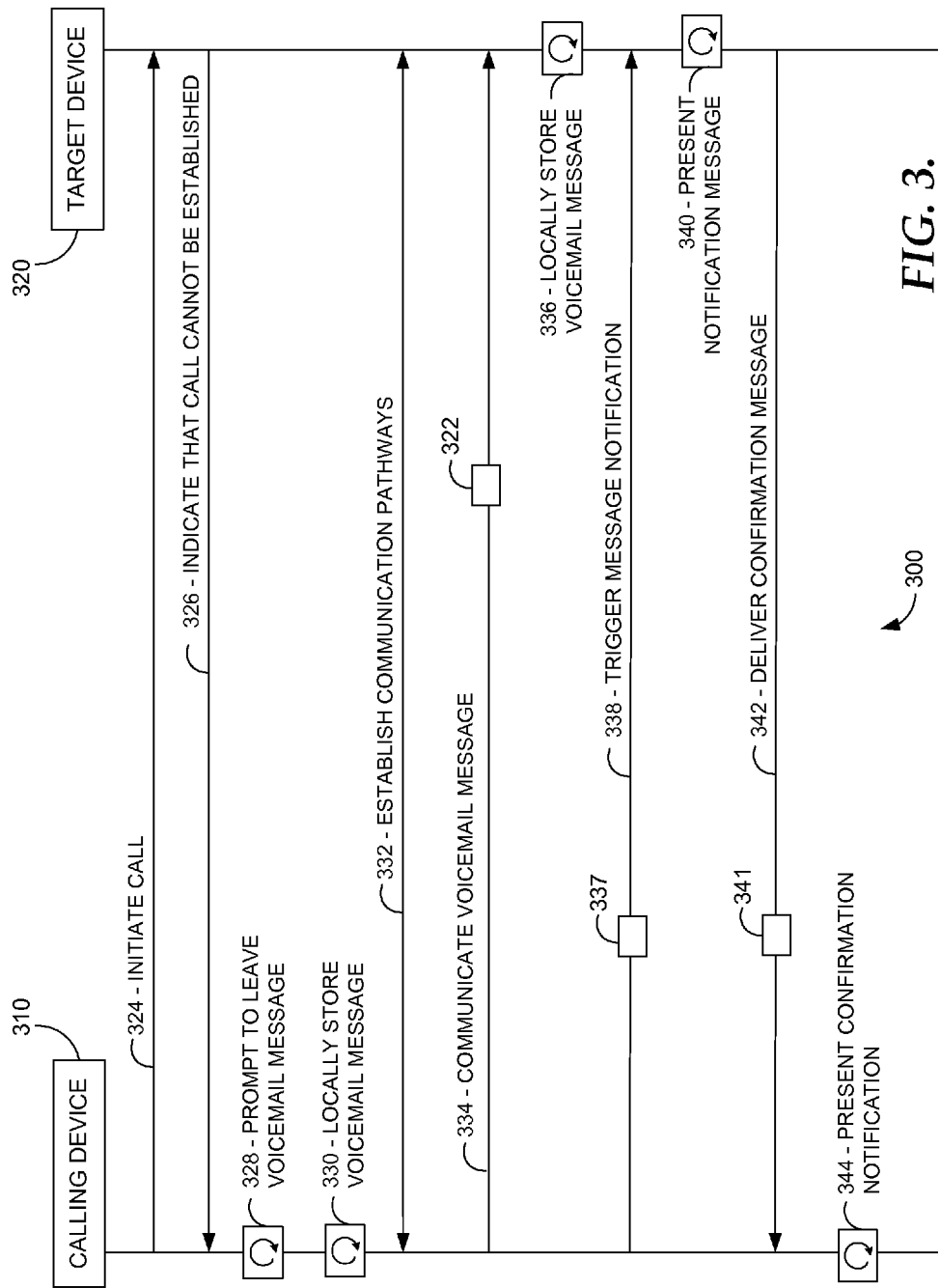
FIG. 3 depicts a process flow that illustrates communicating a locally stored voicemail message according to an embodiment of the present invention.

Turning now to FIG. 3, a sequence diagram illustrating two devices operating in a peer-to-peer type of environment to communicate a locally stored voicemail and generally referenced by the numeral 300. A calling device 310 communicates with a target device 320. Calling device 310 and target device 320 are similar to the previously discussed calling devices. Target device 320 is the device that calling device 310 is attempting to call. It will receive a voicemail message that was locally stored on calling device 310.

At step 324, calling device 310 initiates a call. In one embodiment this occurs by signaling target device 320. The signaling between the calling device 310 and target device 320 could be done in a number of fashions, not limited to system signaling 7 (SS7), SIP, or H.323. A response is sent at a step 326 to the calling device 310 indicating that the call cannot be established with the target device 320.

At step 326, calling device 310 receives an indication that a call cannot be established, and prompts the user to leave a voicemail message 328. A number of happenings can operate as an indication that a call could not be established. Calling device 310 may receive a rejection indication that indicates that a call was rejected by the target device, an indication that the target device was powered off, an indication that there was no answer associated with the target device, an indication that a caller is one of a set of identified callers who are not to be allowed to connect to the target device at a time when the target device is attempted to be connected with, or combinations of the same.

Voicemail message 322 will ultimately be delivered to target device 320. After the user of the calling device 310 has finished recording their voicemail message 322, it is locally stored on calling device 310. Calling device 310 establishes a communication pathway (such as 220) with target device 320 at step 332. In some embodiments, establishment of communications pathway 220 can include signaling (SIP and H.323) over an IP network, or a P2P network. At step 334, calling device 310 communicates voicemail message 322 to the target device 320. As previously mentioned, calling device 310 can establish a data session with target device 320. In some embodiments, it communicates with target device 320 directly, albeit via a wireless-communications network in some cases. This is what we mean by "peer-to-peer manner or environment"—that one device communicates with another. But some artisans may also refer to this as client/host or even client/server inasmuch as the target device is receiving information provided by the calling device. In any case, calling device 310 begins to communicate voicemail 322 to target device 320. Perhaps it is able to send the full file, perhaps not. If not, a new session is established, and downloading can either start over, or in other embodiments, pick up where it left off.

In either case, message 322 is communicated to target device 320, which is represented by numeral 336. Message 322 has all of the fidelity that it had while calling device 310 in some embodiments. In other embodiments, a compression algorithm can be applied to reduce file size. Now, a user can go deep indoors, in a cave, or a submarine and still listen to all of his or her voicemails, and clearly.

In some embodiments, target device 320 provides a trigger to indicate that a recently received voicemail message is waiting. For illustrative purposes and simplification, we have shown a message notification 337 being triggered at step 338 In other embodiments this can happen locally on target device 320. For example, target device 320 could recognize that voicemail message 322 was received, and then present a notification 226 (FIG. 2) on its display. In an alternative embodiment, target device 320 would periodically check its storage space for new files that have not been accessed.

A notification message 226 presented to the user indicates that a message is waiting, and the user can access it. In some embodiments, presenting of the notification message 340 includes a flashing indicator on the target device 320, a pop-up indicator on the screen of the target device 320, or a vibration of the target device 320.

In some embodiments, target device 320 delivers a confirmation message 341 at step 342 to calling device 310. The presentation (e.g., 226 of FIG. 2) associated with the confirmation notification would occur after delivery-confirmation is received.

In some embodiments, an access control list (ACL) can be incorporated that would certainly block calling devices from leaving voicemail messages 322. The ACL could be configurable by the user of target device 320. The list could be included within voicemail client 122, on target device 320, or operate as a separate application. To determine if calling device 310 was listed in the ACL, the ACL could identify calling device 310 by a phone number, IP address, media access control (MAC) address, equipment serial number (ESN), mobile equipment identifier (MEID), or the like.

Figure 4:
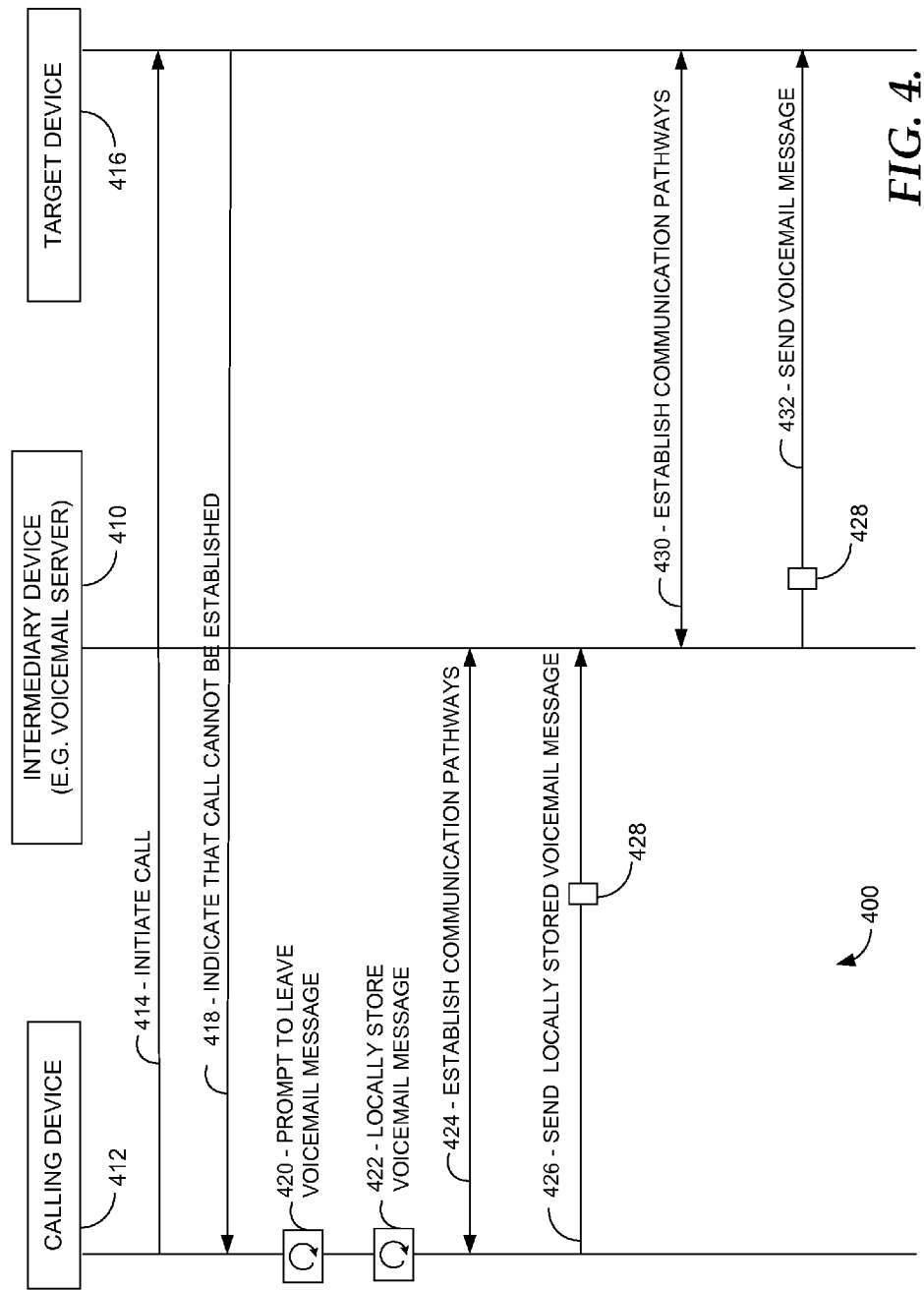
FIG. 4 depicts a process flow that illustrates communicating a locally stored voicemail message according to another embodiment of the present invention.

Turning now to FIG. 4, a sequence diagram illustrating a communication of a locally stored voicemail to a target device is provided and generally referenced by the numeral 400. An intermediary device 410 and a calling device 412 communicate messages to a target device 416. Intermediate device 410, calling device 412, and target device 416 are similar to the previously discussed devices. For illustrative purposes, and so as to not obscure various aspects of the present invention, we will discuss the intermediary device 410 as a voicemail server.

The steps: initiate call 414, indicate that call cannot be established 418, prompt to leave voicemail message 420, and locally store voicemail message 422 are similar to the previously discussed steps in FIG. 3. Any number of ways can be utilized to indicate that the call cannot be established at step 418. We have mentioned some above, and they are equally applicable here. At step 414, calling device 412 attempts to initiate a call 414 with the target device 416. Calling device 412 receives an indication that the call cannot be established at step 418, and prompts the user to leave a voicemail message at step 420. After the user has finished recording their voicemail message, it is locally stored on the calling device 412 at step 422.

At step 424, calling device 412 establishes a communications pathway with intermediary device 410. Signaling between calling device 412 and target device 416 are similar to the technologies previously discussed. These signaling mechanisms can be utilized to communicate with intermediary device 410 as well. At step 424, a communications pathway is established with intermediary device 410. Calling device 412 sends the locally stored voicemail message 428 to server 410 at step 426. Again, this sending can happen in one session or across multiple sessions. Note, in some embodiments, voicemail server 410 can act merely as a pass-thru device, and directly communicate message 428 to target device 416 without ever storing it on server 410.

In one embodiment, intermediary device 410 contacts target device 416, to which voicemail message 428 is intended. When target device 416 is available to receive a message, intermediary device 410 establishes a communication pathway 430 with the target device. This can be a data session and can happen concurrently while target device 416 is being used to conduct a call in some embodiments because the pathway/technology used to send message 428 is a data session rather than a voice session (as can also be the case in FIG. 1).

At step 432, intermediary device 410 sends voicemail message 428 to target device 416. This also can happen all at once, or over multiple sessions if connectivity with target device 416 is spotty. In some embodiments to allow interoperability between a calling device 410 that can locally store a voicemail message 422 and a target device 416 that may not be able to locally store a voicemail message, intermediary device 410 could decode the voicemail message 428, and play out the message to target device 416 as a traditional voicemail retrieved from a voicemail server. Even this embodiment has the benefit of offering a high-fidelity voicemail message to be received because it was not recorded in real time across a wireless network. Rather, it was recorded locally on calling device 412 and then sent up to server 410.

Figure 5:
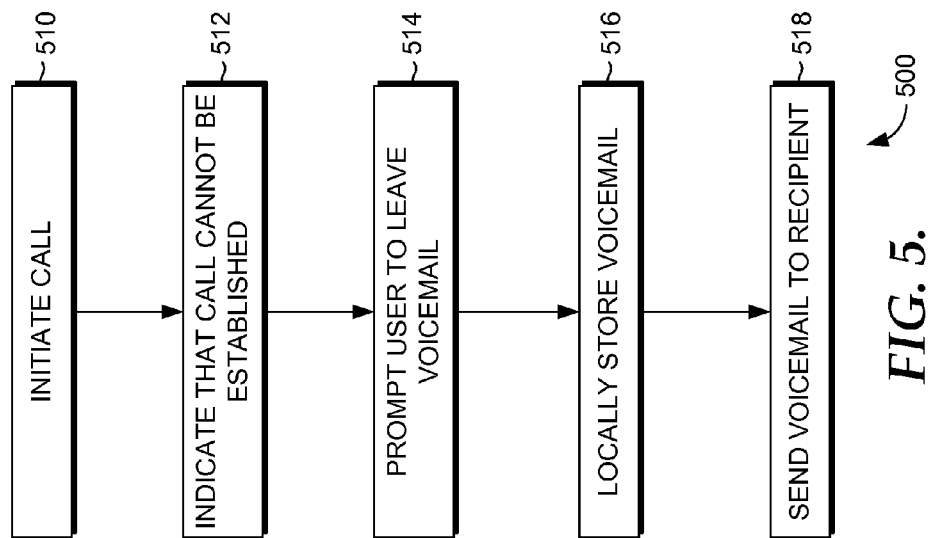
FIGS. 5-8 are flowcharts that depict illustrative ways of carrying out the various aspects of embodiments of the present invention.

Turning now to FIG. 5 (and with reference to FIG. 1), an illustrative flowchart depicting a method for sending voicemail message 114 from calling device 110 to target device 118 is provided and referenced generally by the numeral 500. The devices and steps in FIG. 5 are similar to the devices previously discussed.

At step 510, calling device 110 attempts to initiate a call with target device 118. At step 512, calling device receives an indication that the call cannot be established with target device 118. Calling device 110 prompts the user to record a voicemail at step 514. At step 516, calling device 110 locally stores a recorded voicemail 114 intended for target device 118. At step 518, calling device 110 sends voicemail message 114 to target device 118.

Figure 6:
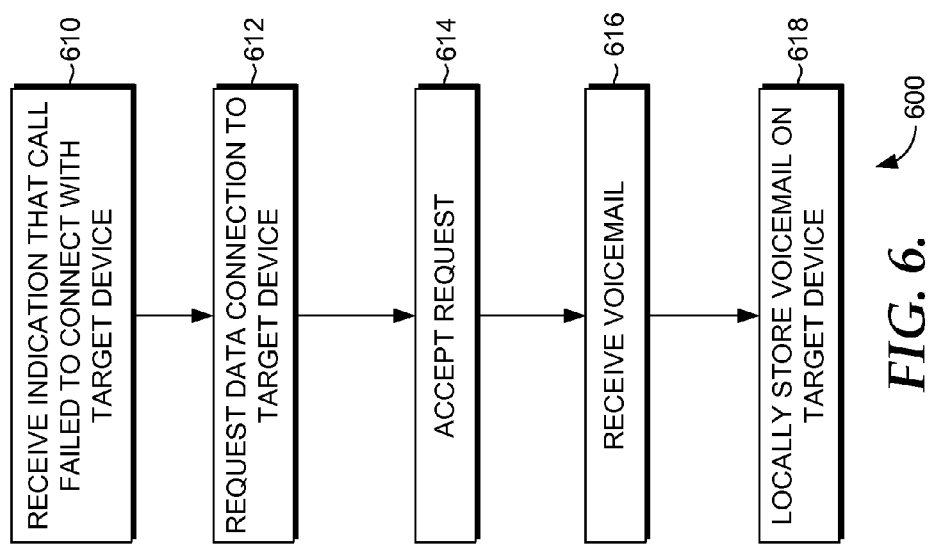

Turning now to FIG. 6, a flowchart depicting an illustrative method for receiving voicemail message 114 from calling device 110 is illustrated and referenced generally by the numeral 600. The devices and steps in FIG. 6 are similar to the devices previously discussed.

At step 610, calling device 110 receives an indication that a call failed to connect with target device 118. Calling device 110 requests a data connection 120 from the target device in step 612. At step 614, target device 118 accepts the request to create data connection 120 from calling device 110. Target device 118 receives voicemail message 114 from calling device 110, as indicated by step 616. In step 618, target device 118 locally stores voicemail message 114.

Figure 7:
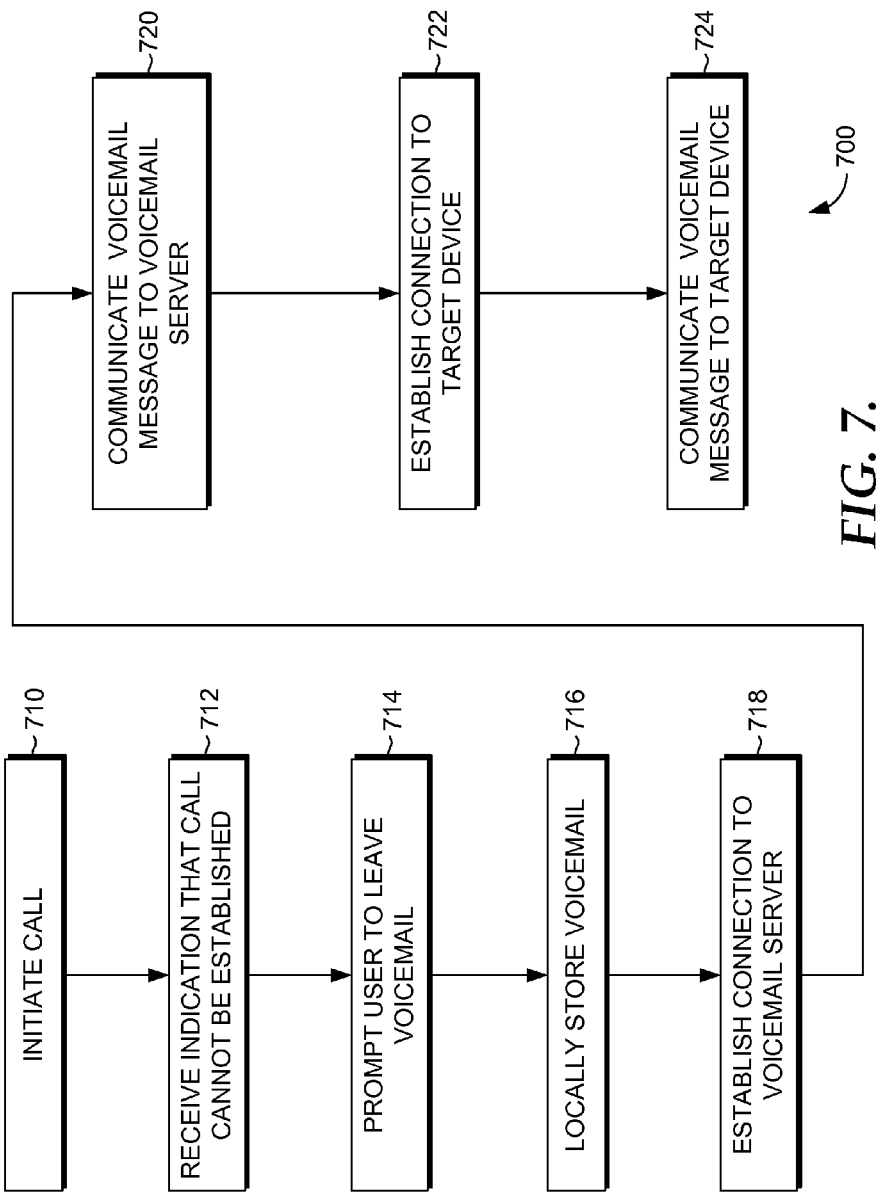

Turning now to FIG. 7 (and referencing FIG. 2 as well), a flowchart of an illustrative method of receiving voicemail message 214 from calling device 210 via intermediate device 222 is provided and referenced generally by the numeral 700. The devices and steps in FIG. 7 are similar to those previously discussed.

At step 710, calling device 210 attempts to initiate a call to target device 218. Calling device 210 receives an indication that the call cannot be established with target device 218. Calling device 210 prompts the user to leave a voicemail message at step 714. At step 716, calling device 210 locally stores voicemail message 214.

At step 718, calling device 210 establishes a connection to intermediary device 222. Calling device 210 communicates voicemail message 214 to intermediary device 222 in step 720. Intermediary device 222 receives voicemail message 214 at step 720, and establishes a connection to target device 218 at step 722. Intermediary device 222 communicates voicemail message 214 to target device 218 at step 724.

Figure 8:
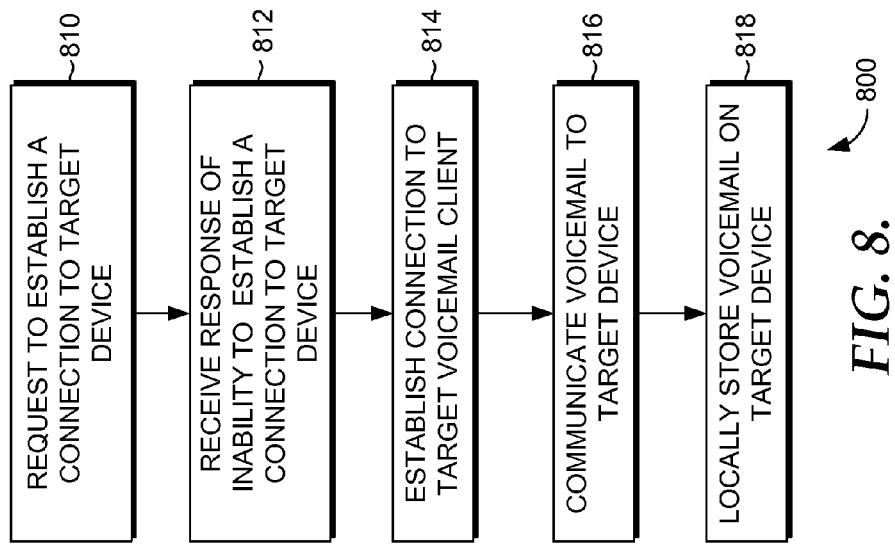

Turning now to FIG. 8 (and with reference to FIG. 1), a flowchart of an illustrative method for sending a voicemail message 114 to a target device 118 using voicemail client 112 is provided and referenced generally by the numeral 800. The devices and steps in FIG. 8 are similar to the devices previously discussed.

At step 810, voicemail client 112 on calling device 110 requests to establish a connection to voicemail client 122 on target device 118. Step 810 stems from an inability to establish a call with target device 118. At step 812, voicemail client 112 receives a response that indicates an inability to establish a call with target device 118. In some embodiments, this response is not an affirmative response; but rather, an omission or lack of receiving an indication that a call could be established. At step 814, a connection is established between the calling device's voicemail client 112 and the target device's voicemail client 122. At step 816, voicemail message 114 is communicated to target device 118. After voicemail message 114 is delivered to voicemail client 122 on target device 118, the voicemail message is stored locally on target device 118 at step 818. In this and other embodiments, acknowledgements and confirmations could be sent as previously described, and consequent indications presented on the device (s).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon for performing a method of communicating a voicemail message from a calling device, the method comprising:

attempting to initiate a call to a target device;

receiving an indication that the call is rejected by the target device incident to attempting to initiate the call;

automatically prompting a user to leave a voicemail message that is to ultimately be delivered to the target device;

locally storing the voicemail message on the calling device;

establishing a first communications pathway with the target device;

establishing a first session with the target device, wherein the first session utilizes the first communications pathway;

communicating a first portion of the voicemail message to the target device by way of the first session;

establishing a second communications pathway with the target device;

establishing a second session with the target device, wherein the second session utilizes the second communications pathway; and communicating a second portion of the voicemail message to the target device by way of the second session.

2. The media of claim 1, wherein attempting to initiate a call to a target device includes signaling the target device with a session initiated protocol (SIP) formatted message.

3. The media of claim 1, wherein establishing the first and the second communications pathways includes one or more of:

establishing a pathway directly between the calling device and the target device; and establishing a pathway that includes an intermediary device between the calling device and the target device.

4. The media of claim 1, wherein establishing the first and the second communications pathways includes establishing the second communications pathway after an attempt to communicate with the target device has completely ended.

5. The media of claim 1, wherein establishing the first and the second communications pathways includes establishing a first and a second data session between the calling device and the target device.

6. The media of claim 1, wherein communicating one or more of the first portion or the second portion of the voicemail message to the target device includes sending the voicemail message via a peer-to-peer (P2P) network.

7. The media of claim 1, wherein the calling device is a session initiated protocol (SIP) compatible device.

8. The media of claim 1, further comprising providing a message-waiting indicator to the target device, thereby indicating that a new voicemail is ready for review, the new voicemail being locally stored on the target device.

9. The media of claim 1, further comprising providing a delivery-confirmation indication to the calling device that indicates that the voicemail message was delivered to the target device.

10. One or more computer-readable media having computer-useable instructions embodied thereon for performing a method of communicating a voicemail message to a target device, the method comprising:
- receiving an indication that a caller is one of a set of identified callers who are not to be allowed to connect to the target device at that particular time;
- receiving a first request to establish a first data-communications pathway with the target device that can be used to communicate data from a calling device to the target device;
- accepting the first request;
- receiving a first portion of a voicemail message stored locally on the calling device by way of the first data-communications pathway;
- locally storing the first portion of the voicemail message on the target device;
- receiving a second request to establish a second data-communications pathway with the target device that can be used to communicate data from the calling device to the target device;
- accepting the second request;
- receiving a second portion of the voicemail message stored locally on the calling device by way of the second data-communications pathway; and
- locally storing the second portion of the voicemail message on the target device.

11. The media of claim 10, wherein a request to establish the first and a second data-communications pathways with the target device includes a session initiated protocol (SIP) formatted message.

12. The media of claim 10, wherein attempting to initiate a call to target device includes signaling the target device with a session initiated protocol (SIP) formatted message.

13. The media of claim 10, wherein the calling device is a session initiated protocol (SIP) compatible device.

14. The media of claim 10, further comprising providing a notification on the target device that indicates that the voicemail message is ready to be at least partially reviewed.

15. The media of claim 10, further comprising providing a confirmation message to the calling device that the voicemail message was successfully delivered to the target device.

16. The media of claim 10, further comprising facilitating playback of the locally stored voicemail message.

17. One or more computer-readable media having computer-useable instructions embodied thereon for performing a method of communicating a locally stored voicemail message from an intermediary device, the method comprising:
- receiving an attempt to initiate a call from a calling device;
- receiving an indication that the call cannot be established with a target device;
- communicating the indication to the calling device;
- receiving a first request to establish a first communications pathway with the calling device;
- accepting the first request;
- receiving a first portion of a locally stored voicemail message from the calling device by way of the first communications pathway;
- storing the first portion of the locally stored voicemail message from the calling device;
- receiving a second request to establish a second communications pathway with the calling device;
- accepting the second request;
- receiving a second portion of the locally stored voicemail message from the calling device by way of the second communications pathway;
- storing the second portion of the locally stored voicemail message from the calling device;
- sending a third request to establish a third communications pathway to the target device; and
- communicating the entire locally stored voicemail message to the target device.

18. The media of claim 17, wherein one or more of the first, second or third communications pathways are established by utilizing a peer-to-peer (P2P) protocol.

19. One or more computer-readable media having computer-useable instructions embodied thereon for performing a method of communicating a voicemail message from a first voicemail client, the method comprising:
- sending a first request to establish a first communications session with a second voicemail client, the request stemming from an inability to set up a call between a first calling device and a second calling device;
- receiving a first response that indicates an inability to establish the first communications session;
- establishing a second communications session between the first voicemail client and the second voicemail client, said second voicemail client residing on said second calling device; and
- communicating a first portion of the voicemail message to the second voicemail client, the voicemail message being locally stored on the first calling device that attempted to set up the call between the first calling device and the second calling device; and
- locally storing the entire voicemail communicated from the first voicemail client on the second calling device.

* * * * *